March 29, 1960  K. C. CASSEL  2,930,146
ARITHMETICAL AID FOR TEACHING FRACTIONS
Filed Sept. 2, 1958
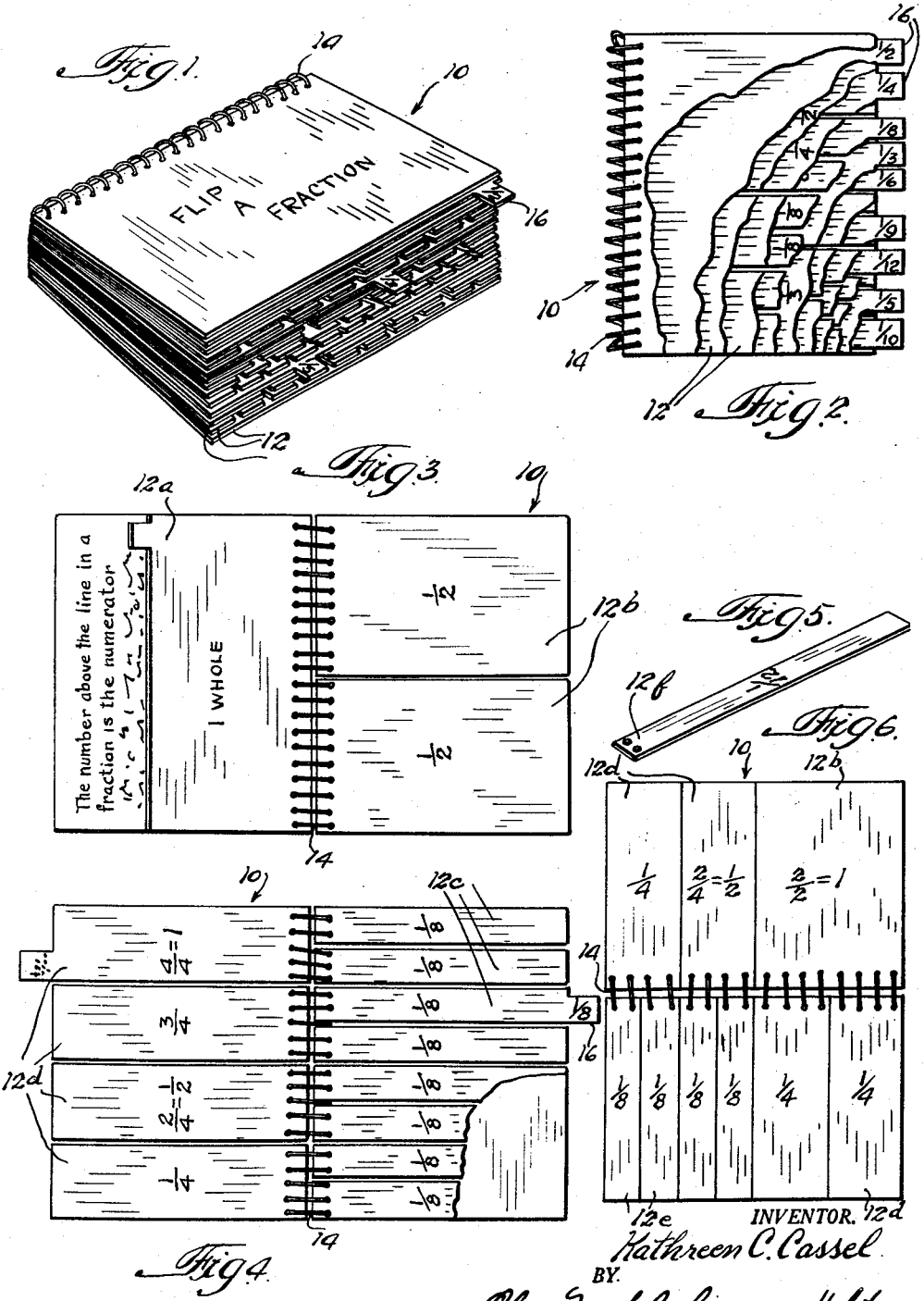
INVENTOR.
Kathreen C. Cassel
BY
Olson, Mecklenburger, van Holst,
Pendleton & Neuman
ATTYS.

United States Patent Office 2,930,146
Patented Mar. 29, 1960

2,930,146

ARITHMETICAL AID FOR TEACHING FRACTIONS

Kathreen C. Cassel, Chicago, Ill.

Application September 2, 1958, Serial No. 758,420

6 Claims. (Cl. 35—31)

This invention relates to a visual aid for assisting children in the process of learning fractions.

The study of arithmetic oftentimes is one of the first experiences a child has with the abstract. The science of numbers, and fractions in particular, is both difficult and uninteresting for many children.

It is an object of this invention to provide a simple and colorful arithmetical aid that is appealing to children and, more important, one which will help a child to understand and master fractions.

It is another object of this invention to provide an arithmetical aid which may easily be carried in a child's pocket for ready reference.

It is another object of this invention to provide an arithmetical aid which may be used and understood by a child either alone or in a classroom group.

It is another object of this invention to provide an arithmetical aid which visually explains the relationship between various simple fractions.

It is a still further object of this invention to provide a visual aid composed of inexpensive well-known materials thereby enabling the aids to be manufactured at minimum cost.

The above and other objects of this invention will become more apparent upon proceeding with the following detailed description when read in the light of the accompanying drawing and appended claims.

In one embodiment of the arithmetical aid provided, sheets divided into fractional parts are bound together in a compact booklet form. The divided sheets are so arranged that fractions which are multiples of other fractions are arranged in consecutive relationship therewith in the booklet. For example, the ¼ fraction sheet is arranged in superposed relationship with the ⅛ fraction sheet; the ⅓ sheet with the ⅙. Thus the fraction relationship is visually apparent at a glance.

The sections of an individual sheet are uniformly colored to distinguish the specific fractional parts from the parts of other sheets, and the fractional part of the sheet which each section comprises is printed or otherwise suitably impressed on the uppermost surface thereof.

Printed on the reverse side of each sheet section is the sum defined by each section and those sheet fractional sections extending to the sheet left-hand margin; the sum, or fraction total, is also expressed to its lowest terms when possible.

For a more complete understanding of this invention reference will now be made to the drawing, wherein:

Figure 1 is a perspective view of one embodiment of the provided arithmetical aid;

Fig. 2 is a top plan view of the arithmetical aid of Fig. 1 illustrating various sheets thereof broken away;

Fig. 3 is a top plan view of an aid and illustrates the first page thereof in a raised position;

Fig. 4 is a top plan view of the embodiment illustrated in Fig. 1 in a flat open position;

Fig. 5 is a perspective view of one sheet section employed in the illustrated aid; and Fig. 6 is a top plan view of an aid similar to Fig. 4 with portions of three fraction sheets exposed.

Referring now more particularly to Fig. 1, one embodiment of the arithmetical visual aid is illustrated and identified by the numeral 10. It will be noted that the aid comprises a compact booklet which is easily carried in a child's pocket. It may of course be manufactured in any desired size, larger constructions being perhaps desirable if the booklet is to be utilized for classroom work.

From Fig. 1 it will be seen that the aid comprises a number of uniform sheets 12 retained in bound assembly by means of a spiral band 14 intermittently traversing one lateral edge of the superposed sheets. Band 14 enables the booklet 10 to be opened into a position whereby opposed sheets may lie in a flat condition on a substantially horizontal plane in the manner illustrated in Fig. 4.

Each of the sheets 12 identifies a whole or complete unit made up of discrete sheet sections having a common denominator; the whole is divided into sections which correspond in size to the value of the fraction being represented. All sections of each sheet are preferably fabricated of a material such as a stiff celluloid which will last indefinitely with normal use. Each individual sheet and the sections comprising the same will be distinguished from the sections of other sheets by an identifying color. The color identification not only facilitates recognition of specific fractional parts but also renders the aid colorful and as a result appealing to children.

It will be seen from Figs. 1 and 2 that projecting tab portions 16 bearing identifying fractions thereon facilitate locating a desired fraction sheet in the booklet. The sheets are so arranged that fractions which are multiples of smaller fractions are disposed adjacent such smaller-fraction sheets. Thus the ½ sheet will be disposed in consecutive relationship with the ¼ sheet, and the ¼ sheet will be interposed between the ½ and ⅛ sheets. Likewise the ⅓ fraction sheet will be disposed in juxtaposition in the booklet with the ⅙ sheet, which in turn will be interposed between the ⅓ and ⅑ sheets in the manner illustrated in Fig. 2. Such a relative disposition clearly shows and teaches the relationship among the fractional parts or sections of the various fraction sheets. The "whole" or unit sheet 12a illustrated in Fig. 3 of course is not divided into sections and is preferably disposed in juxtaposition with the cover which may have instructions printed thereon as illustrated.

From Fig. 3 it will be seen that two sections 12b of the ½ fraction sheet are of the same width and equal the "whole" sheet 12a with which it is consecutively arranged.

From Fig. 4 it is apparent that two one-eighth sections 12c of the ⅛ fraction sheet are equivalent to a one-fourth section 12d of the ¼ fraction sheet. It will also be seen that four parts of the ⅛ fraction sheet occupy the same area, and are equivalent to, the two-fourths or half portion of the ¼ fraction sheet.

By turning appropriate sections of consecutive fraction sheets the relationship among three and even more fractional parts is readily apparent as in Fig. 6. As seen in the latter figure the ½ fraction sheet may be placed face down; half of the ¼ fraction sheet may be moved over half of the reverse side of the ½ fraction sheet. The resulting exposed sheet sections are half of the ½ fraction sheet having disposed alongside two-quarters of the ¼ fraction sheet making up one page of the open booklet. The oppositely disposed page constitutes two-quarters of the ¼ fraction sheet alongside of which are disposed four-eighths of the ⅛ fraction sheet.

By manipulating the sheets in the manner described a child will be able to see at a glance that two-quarters are the equivalent of one-half; that four-eighths also equal one-half, and that two-quarters also has the same value.

It is apparent that each section of a particular fraction sheet should be engaged by a sufficient number of turns of the binding coil 14 so that the sections will all remain in a desired position normally disposed to the binder. Fig. 5 illustrates smallest sheet section 12f of the illustrated aid 10 which is secured in the booklet by two coil turns assuring a compact booklet assembly. The number of fraction sheets to be bound in the visual aid is obviously determined by the desired size of the resulting booklet.

The upper face of each fraction sheet section has imprinted thereon the fractional portion of the sheet such section constitutes, as will be seen from Figs. 3 and 4. The reverse or undersurface of each fractional sheet section has imprinted thereon the sum of the particular sheet section, and those sections disposed between itself and the left-hand margin. In other words, the sections of a sheet are successively added and the sum placed on each section undersurface, proceeding from left to right.

As will be noted from Fig. 4, the sum of the fractions are reduced to their lowest terms so that a child studying the undersurface of the sheet sections may readily visualize the relation between two different fractions having the same quantitative value but expressed in different terms.

It is seen therefore that a visual arithmetical aid has been provided in a compact, durable booklet form desirable for individual or group use. The provided aid may be formed of colorful materials which are not only appealing to children but also help identify the specific fractions. The booklet is conducive to self teaching as it visually explains the nature of fractions. The arrangement of the booklet sheets described above clearly shows the relationship among various fractions and helps clarify the relationship among various fractional parts. Being in compact booklet form, all portions of the aid are securely assembled and bound in such a manner that the sheets do not become ineffective through loss of parts even after considerable use.

It is obvious that certain changes may be made in the embodiment preferred. It is intended therefore that this invention be limited only by the scope of the appended claims.

I claim:

1. An educational device for teaching the fractional parts of a whole unit comprising a plurality of bound sheets of equal size, each of said sheets being divided into a number of equal fractional sections, the numerical fraction of the sheet each section comprises being impressed on each section, said sheets being arranged so that sheets composed of fractional sections comprising multiples of other sheet sections are in consecutive order therewith.

2. An educational device for teaching the fractional parts of a whole unit comprising a plurality of bound sheets of equal size, each of said sheets being divided into a number of equal fractional sections, the numerical fraction of each sheet each section comprises being impressed on each section, said sheets being arranged with those fractional sections comprising multiples of other fractional sections in consecutive order, the fractional sections of each sheet having the same identifying color.

3. An educational device for teaching the fractional parts of a whole unit comprising a plurality of bound sheets of equal size, each of said sheets being divided into a number of equal fractional sections, the numerical fractional part of each sheet each section comprises being impressed on each section, said sheets being arranged with those fractional sections comprising multiples of other fractional sections in consecutive order, the reverse face of each fractional section having a numerical value disposed thereon, said value being defined by said fractional section and those fractional sections of the sheet arranged to the left thereof.

4. The device as recited in claim 3 in which all of said values are reduced to their lowest terms.

5. An educational device for teaching the fractional parts of a whole unit comprising a plurality of bound sheets of equal size, each of said sheets being divided into a number of equal fractional parts, the fraction of the sheet each part comprises being impressed on each part, said sheets being arranged with those fractions comprising multiples of other fractions in consecutive order, projecting tab portions secured to each sheet having the fractions into which the sheet is divided imprinted thereon, each tab being of the same color as the sheet to which affixed.

6. An educational device for teaching the fractional parts of a whole unit comprising a plurality of bound sheets of equal size, each of said sheets being divided into a number of equal fractional parts, the numerical fraction of the sheet it comprises being impressed on each part, said sheets being arranged with those fractions comprising multiples of other fractions in consecutive order, said fractional parts of all of said sheets being bound along one lateral edge whereby at least one fractional part of one sheet may be arranged in overlying relationship with at least one fractional part of another sheet.

References Cited in the file of this patent

UNITED STATES PATENTS

| | | |
|---|---|---|
| 1,279,504 | Blau | Sept. 24, 1918 |
| 2,826,829 | Koons | Mar. 18, 1958 |